United States Patent
Elliott et al.

(10) Patent No.: US 9,809,386 B2
(45) Date of Patent: Nov. 7, 2017

(54) COUNTERWEIGHT ORE CHUTE SYSTEM

(71) Applicants: Ronald Paul Elliott, North Bay (CA); Bryan Jay Keslo, North Bay (CA)

(72) Inventors: Ronald Paul Elliott, North Bay (CA); Bryan Jay Keslo, North Bay (CA)

(73) Assignee: NORDIC MINESTEEL TECHNOLOGIES INC., North Bay, ON (CA)

( * ) Notice: Subject to any disclaimer, the term of this patent is extended or adjusted under 35 U.S.C. 154(b) by 84 days.

(21) Appl. No.: 14/728,382

(22) Filed: Jun. 2, 2015

(65) Prior Publication Data

US 2016/0355329 A1    Dec. 8, 2016

(51) Int. Cl.
| | |
|---|---|
| *B65G 1/00* | (2006.01) |
| *B65G 11/12* | (2006.01) |
| *B65G 11/20* | (2006.01) |

(52) U.S. Cl.
CPC .......... *B65G 11/126* (2013.01); *B65G 11/206* (2013.01)

(58) Field of Classification Search
CPC .................................................... B65D 88/62
USPC ........ 414/288, 292, 299, 305, 306, 309, 322
See application file for complete search history.

(56) References Cited

U.S. PATENT DOCUMENTS

RE16,633 E    5/1927  Titus
4,081,004 A *  3/1978  Harris ..................... B65B 37/18
                                                    141/10
4,793,512 A   12/1988  Krauss
5,610,346 A *  3/1997  Stelts ..................... G01K 7/025
                                                    266/100

FOREIGN PATENT DOCUMENTS

| CN | 2329767   | 7/1999  |
| CN | 201763387 | 3/2011  |
| DE | 3904305   | 8/1990  |
| GB | 907347    | 10/1962 |
| RU | 2347911   | 2/2009  |

OTHER PUBLICATIONS

International Search Report for Australian Patent Application No. 2015285967 dated May 19, 2016.
International Search Report and Written Opinion for PCT/CA2015/000393 dated Jun. 2, 2015.

* cited by examiner

*Primary Examiner* — Saul Rodriguez
*Assistant Examiner* — Willie Berry, Jr.

(57) ABSTRACT

An ore chute system, comprising: a chute box for collecting material and having a chute opening formed therein for discharging the material therethrough; a chute press gate mounted over the chute opening and moveable between an opened position to allow discharge of the material from the chute box and a closed position to prevent discharge of the material from the chute box; a chute press gate actuator coupled to the chute press gate and controllable to move the chute press gate between the opened position and the closed position; and, a chute press gate counterweight system coupled to the chute press gate and configured to move the chute press gate from the opened position to the closed position upon failure of the chute press gate actuator.

34 Claims, 20 Drawing Sheets

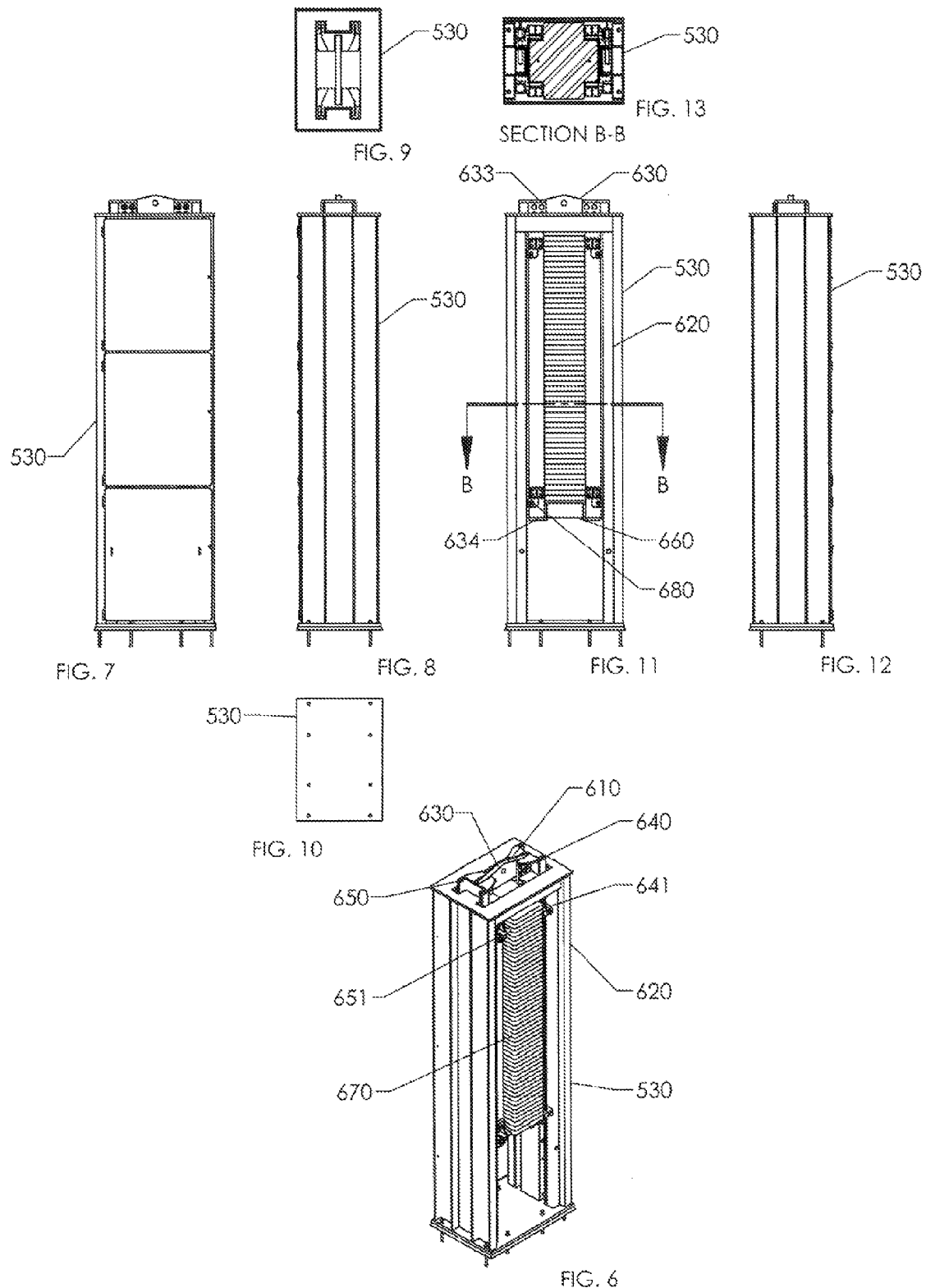

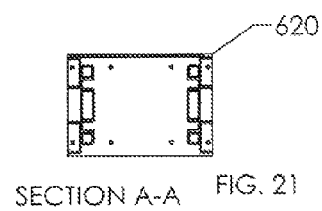
SECTION A-A FIG. 21
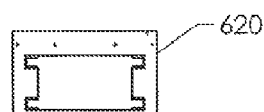
FIG. 18
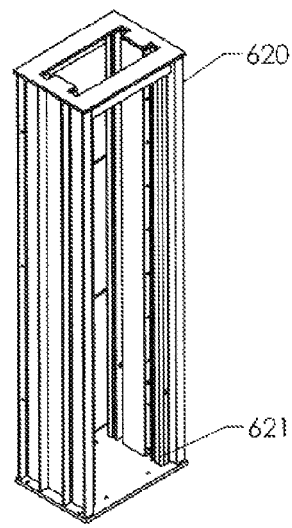
FIG. 14
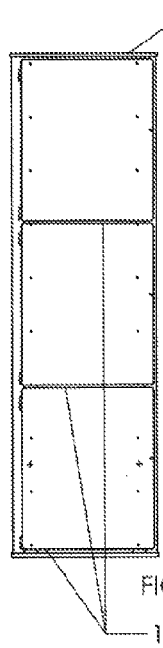
FIG. 15
1500
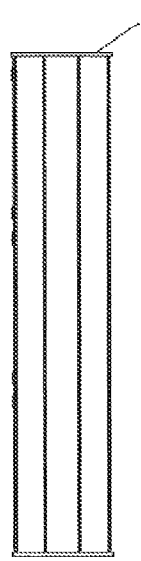
FIG. 16
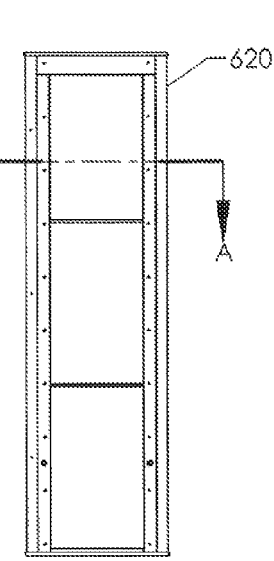
FIG. 17
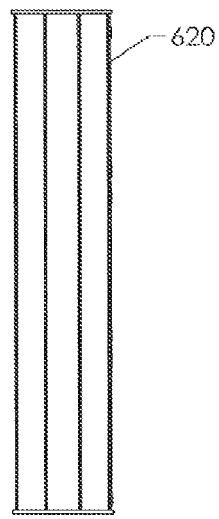
FIG. 20
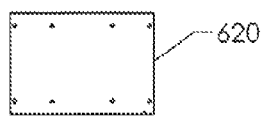
FIG. 19

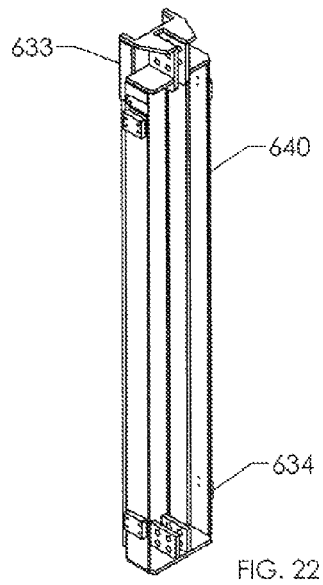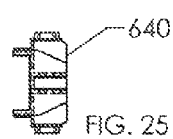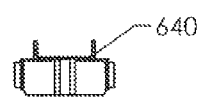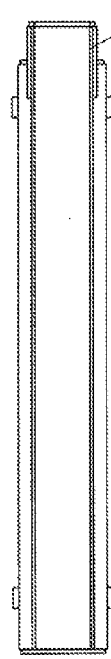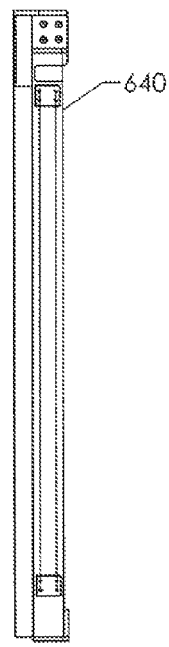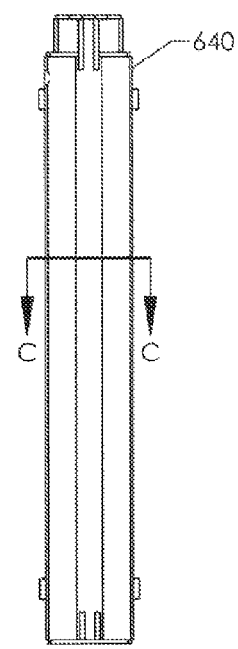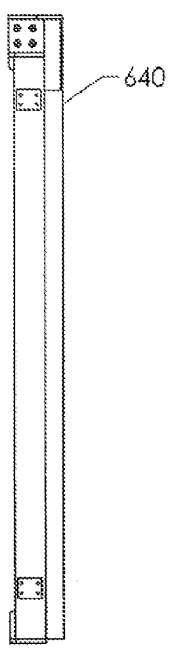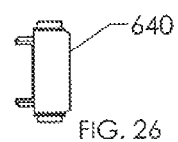

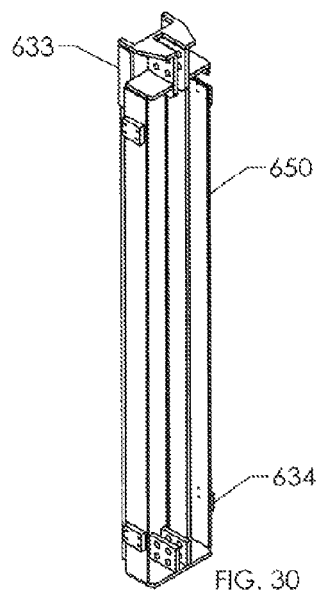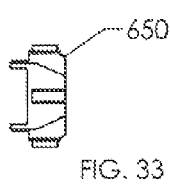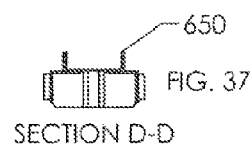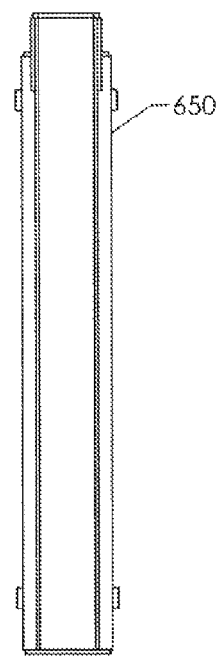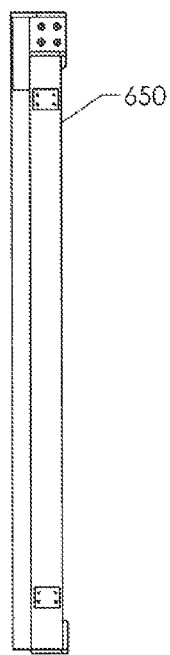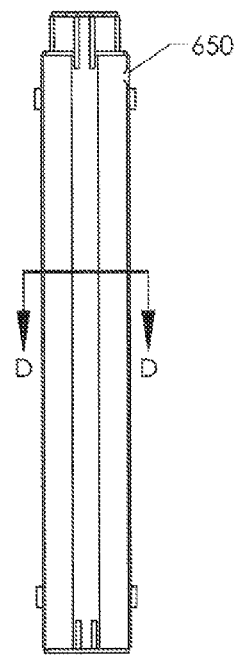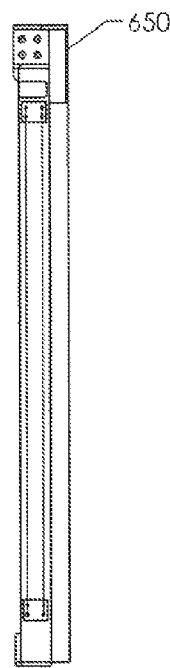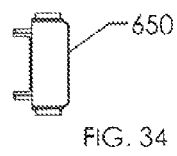

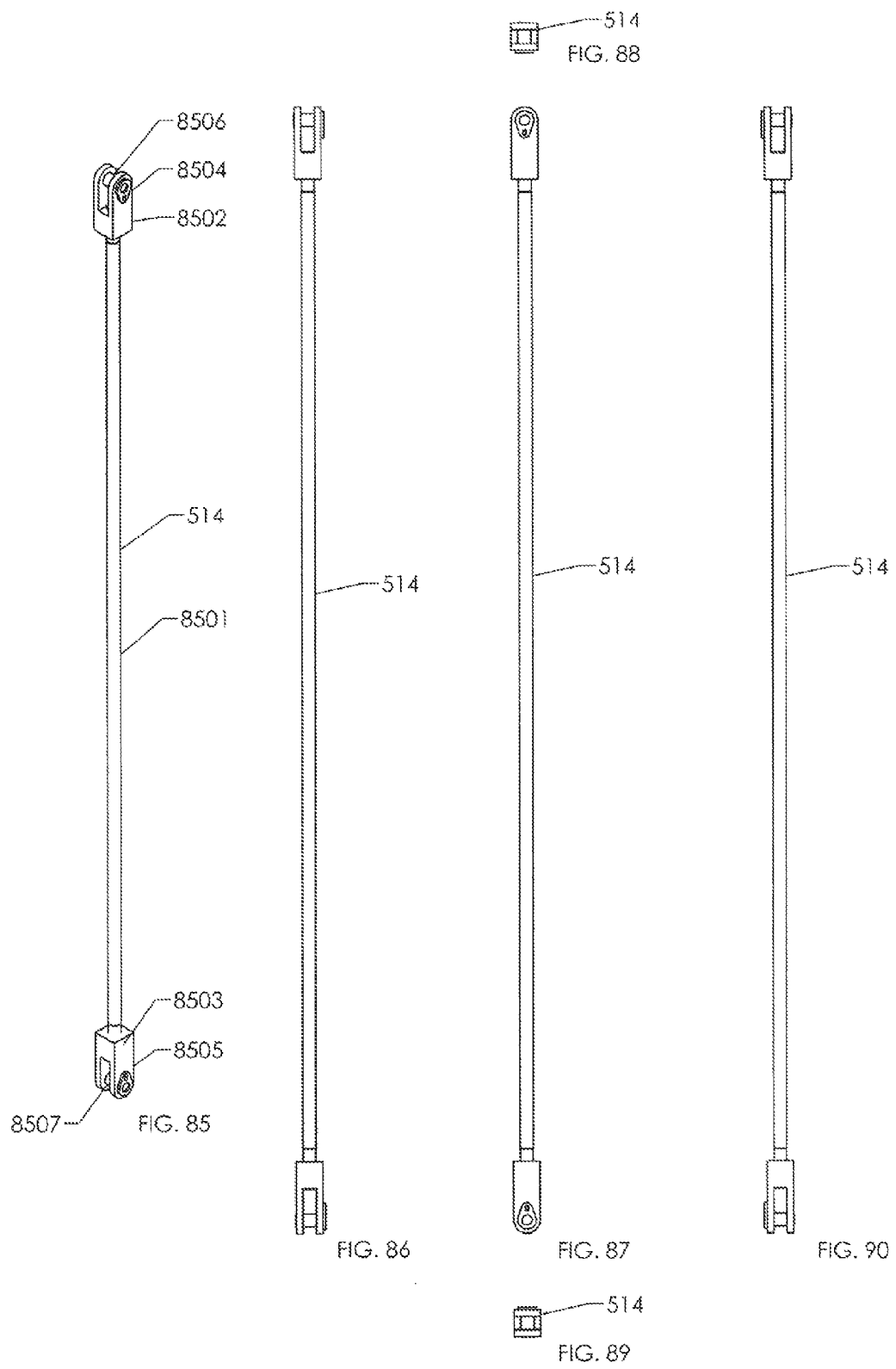

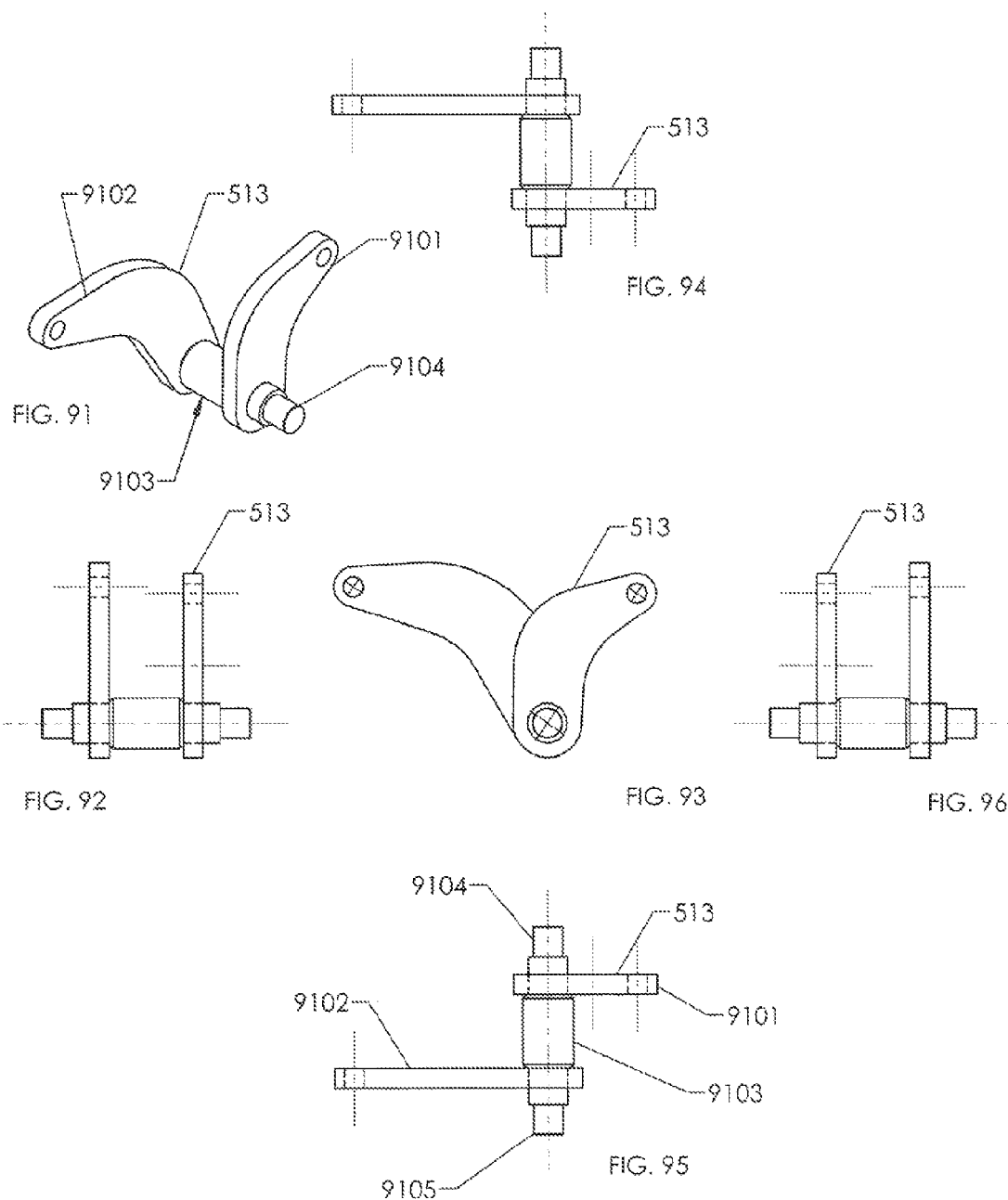

COUNTERWEIGHT ORE CHUTE SYSTEM

FIELD OF THE APPLICATION

This application relates to the field of ore and material handling, and more specifically, to a counterweight ore chute system.

BACKGROUND

An ore pass is an inclined, vertical or near-vertical opening or passage for the transfer of ore or other material in underground mines using the force of gravity.

Ore passes may be of two general types, namely, full and flow-through. In both systems, the ore is dumped into the ore pass and eventually ends up at a loading point. Following this, the ore is typically transferred via a secondary transport method such as a railcar, conveyor, etc. In a full ore pass system, a certain level of ore is maintained in the ore pass at all times. Although there is an increased risk of hang-ups associated with this system, it greatly reduces ore pass degradation because there are fewer high energy impacts with ore pass walls. Keeping the ore pass full also allows for the stability and shape of the ore pass to be maintained. In a flow-through ore pass system, ore is dumped into the ore pass when available and flows down to the loading point. Hang-ups are less likely to occur in a flow-through system because the ore is allowed to flow most of the way down the pass without delay. Despite the prevention of hang-ups with the flow-through system, this system often results in degradation of the ore pass. As the material travels further along the pass, it gains momentum and the accumulation of impacts has the potential to cause structural damage to the ore pass.

Thus, ore passes are used to deliver ore or other material to a loading point which may be a chute box, bin, hopper, silo, etc. Unloading of ore from the chute box may be carried out using an underflow or side discharge opening or chute formed in the chute box. The chute may be used to transfer the ore or other material to a railcar system or other means by which the ore or other material may be transferred to the surface or elsewhere.

The chute of the chute box has a control gate that is typically opened and closed by an operator using a hydraulic control system. Several different types of control gates may be used such as press gates, undercut arc gates, guillotine gates, finger gates, or bar and chain gates.

Hazards associated with ore passes are a significant safety problem in underground mines. Injury and fatality data show that many injuries are related to pulling or freeing hang-ups in ore pass chutes and to mechanical failures of chutes, control gates, and ore pass walls.

In particular, current ore chute designs typically use a hydraulic accumulator (i.e., a pressure storage device) for storing energy to safely close the control gate in the event of an emergency or power failure. However, if the hydraulic accumulator is not monitored or maintained, the potential for failure and resulting damage or injury remains.

A need therefore exists for an improved ore chute system. Accordingly, a solution that addresses, at least in part, the above and other shortcomings is desired.

SUMMARY OF THE APPLICATION

According to one aspect of the application, there is provided an ore chute system, comprising: a chute box for collecting material and having a chute opening formed therein for discharging the material therethrough; a chute press gate mounted over the chute opening and moveable between an opened position to allow discharge of the material from the chute box and a closed position to prevent discharge of the material from the chute box; a chute press gate actuator coupled to the chute press gate and controllable to move the chute press gate between the opened position and the closed position; and, a chute press gate counterweight system coupled to the chute press gate and configured to move the chute press gate from the opened position to the closed position upon failure of the chute press gate actuator.

BRIEF DESCRIPTION OF THE DRAWINGS

Features and advantages of the embodiments of the present application will become apparent from the following detailed description, taken in combination with the appended drawings, in which:

FIG. 6 is a front perspective view illustrating a counterweight assembly of the counterweight system of FIG. 5, in accordance with an embodiment of the application;

FIG. 7 is a rear view illustrating the counterweight assembly of FIG. 6;

FIG. 8 is a left side view illustrating the counterweight assembly of FIG. 6;

FIG. 9 is a top view illustrating the counterweight assembly of FIG. 6;

FIG. 10 is a bottom rear view illustrating the counterweight assembly of FIG. 6;

FIG. 11 is a front view illustrating the counterweight assembly of FIG. 6;

FIG. 12 is a right side view illustrating the counterweight assembly of FIG. 6;

FIG. 13 is a cross-sectional view taken along line B-B in FIG. 11;

FIG. 14 is a front perspective view illustrating a counterweight frame of the counterweight assembly of FIG. 6, in accordance with an embodiment of the application;

FIG. 15 is a rear view illustrating the counterweight frame of FIG. 14;

FIG. 16 is a left side view illustrating the counterweight frame of FIG. 14;

FIG. 17 is a front view illustrating the counterweight frame of FIG. 14;

FIG. 18 is a top view illustrating the counterweight frame of FIG. 14;

FIG. 19 is a bottom view illustrating the counterweight frame of FIG. 14;

FIG. 20 is a right side view illustrating the counterweight frame of FIG. 14;

FIG. 21 is a cross-sectional view taken along line A-A in FIG. 17;

FIG. 22 is a front perspective view illustrating a right counterweight guide of the counterweight assembly of FIG. 6, in accordance with an embodiment of the application;

FIG. 23 is a rear view illustrating the right counterweight guide of FIG. 22;

FIG. 24 is a left side view illustrating the right counterweight guide of FIG. 22;

FIG. 25 is a top view illustrating the right counterweight guide of FIG. 22;

FIG. 26 is a bottom view illustrating the right counterweight guide of FIG. 22;

FIG. 27 is a front view illustrating the right counterweight guide of FIG. 22;

FIG. 28 is a right side view illustrating the right counterweight guide of FIG. 22;

FIG. 29 is a cross-sectional view taken along line C-C in FIG. 27;

FIG. 30 is a front perspective view illustrating a left counterweight guide of the counterweight assembly of FIG. 6, in accordance with an embodiment of the application;

FIG. 31 is a rear view illustrating the left counterweight guide of FIG. 30;

FIG. 32 is a left side view illustrating the left counterweight guide of FIG. 30;

FIG. 33 is a top view illustrating the left counterweight guide of FIG. 30;

FIG. 34 is a bottom view illustrating the left counterweight guide of FIG. 30;

FIG. 35 is a front view illustrating the left counterweight guide of FIG. 30;

FIG. 36 is a right side view illustrating the left counterweight guide of FIG. 30;

FIG. 37 is a cross-sectional view taken along line D-D in FIG. 35;

FIG. 85 is a front perspective view illustrating a chute press gate connecting rod assembly of the counterweight system of FIG. 5, in accordance with an embodiment of the application;

FIG. 86 is a left side view illustrating the chute press gate connecting rod assembly of FIG. 85;

FIG. 87 is a front view illustrating the chute press gate connecting rod assembly of FIG. 85;

FIG. 88 is a top view illustrating the chute press gate connecting rod assembly of FIG. 85;

FIG. 89 is a bottom view illustrating the chute press gate connecting rod assembly of FIG. 85;

FIG. 90 is a right side view illustrating the chute press gate connecting rod assembly of FIG. 85;

FIG. 91 is a front perspective view illustrating a lever arm assembly of the counterweight system of FIG. 5, in accordance with an embodiment of the application;

FIG. 92 is a left side view illustrating the lever arm assembly of FIG. 91;

FIG. 93 is a front view illustrating the lever arm assembly of FIG. 91;

FIG. 94 is a top view illustrating the lever arm assembly of FIG. 91;

FIG. 95 is a bottom view illustrating the lever arm assembly of FIG. 91;

FIG. 96 is a right side view illustrating the lever arm assembly of FIG. 91;

It will be noted that throughout the appended drawings, like features are identified by like reference numerals.

DETAILED DESCRIPTION OF THE EMBODIMENTS

In the following description, details are set forth to provide an understanding of the application. In some instances, certain structures, techniques and methods have not been described or shown in detail in order not to obscure the application.

As mentioned above, current ore chute designs typically use a hydraulic accumulator (i.e., a pressure storage device) for storing energy to safely close the control or press gate in the event of an emergency or power failure. However, if the hydraulic accumulator is not monitored or maintained, the potential for failure and resulting damage or injury remains.

According to the present application, a counterweight ore chute system 100 is provided that reduces the risk of failure from a faulty or poorly maintained hydraulic accumulator. According to the present application, the ore chute system 100 uses mechanical lever arms and/or pulleys in a counterweight system that always reverts the control or press gate to a closed position during any hydraulic, pneumatic, electrical, or cylinder failure.

Figure 1:
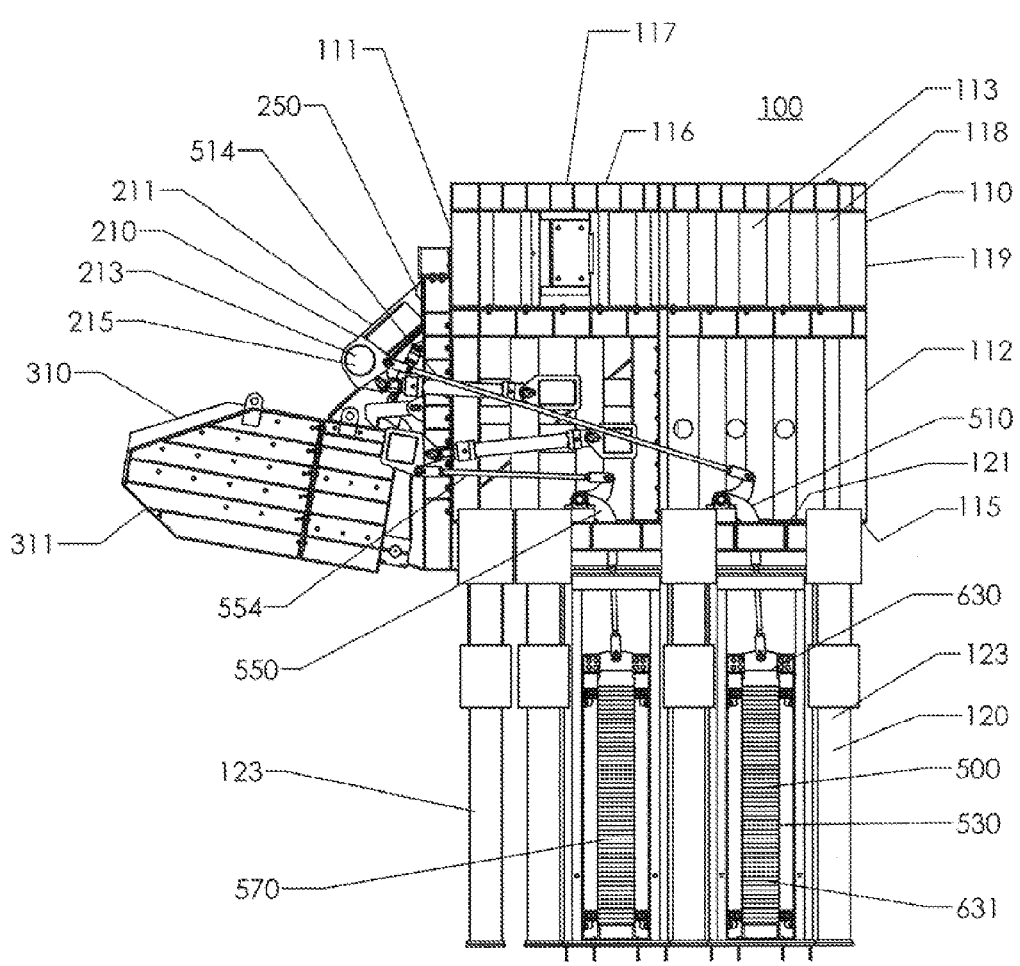
FIG. 1 is a right side view illustrating an ore chute system, the chute press gate being in a closed position, and the chute lip being in a raised position, in accordance with an embodiment of the application.
Figure 2:
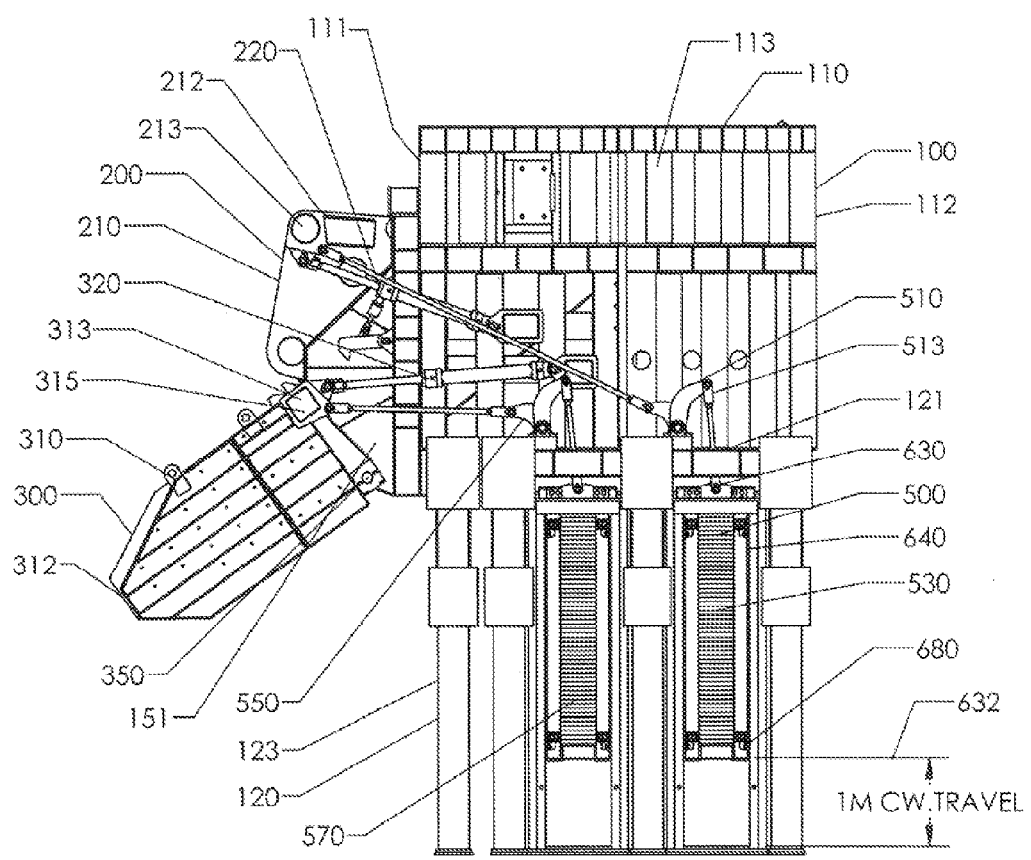
FIG. 2 is a right side view illustrating the ore chute system of FIG. 1, the chute press gate being in an opened position, and the chute lip being in a lowered position, in accordance with an embodiment of the application.
Figure 3:
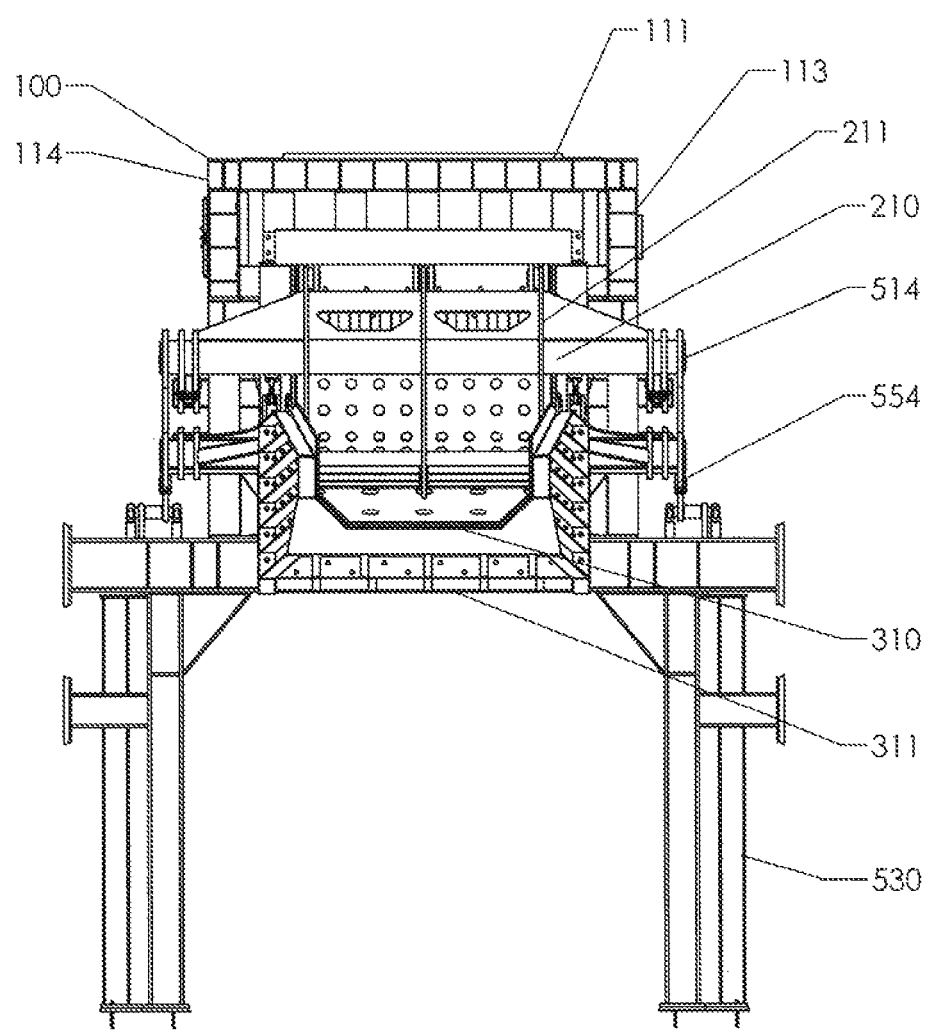
FIG. 3 is a front view of the ore chute system of FIG. 1.
Figure 4:
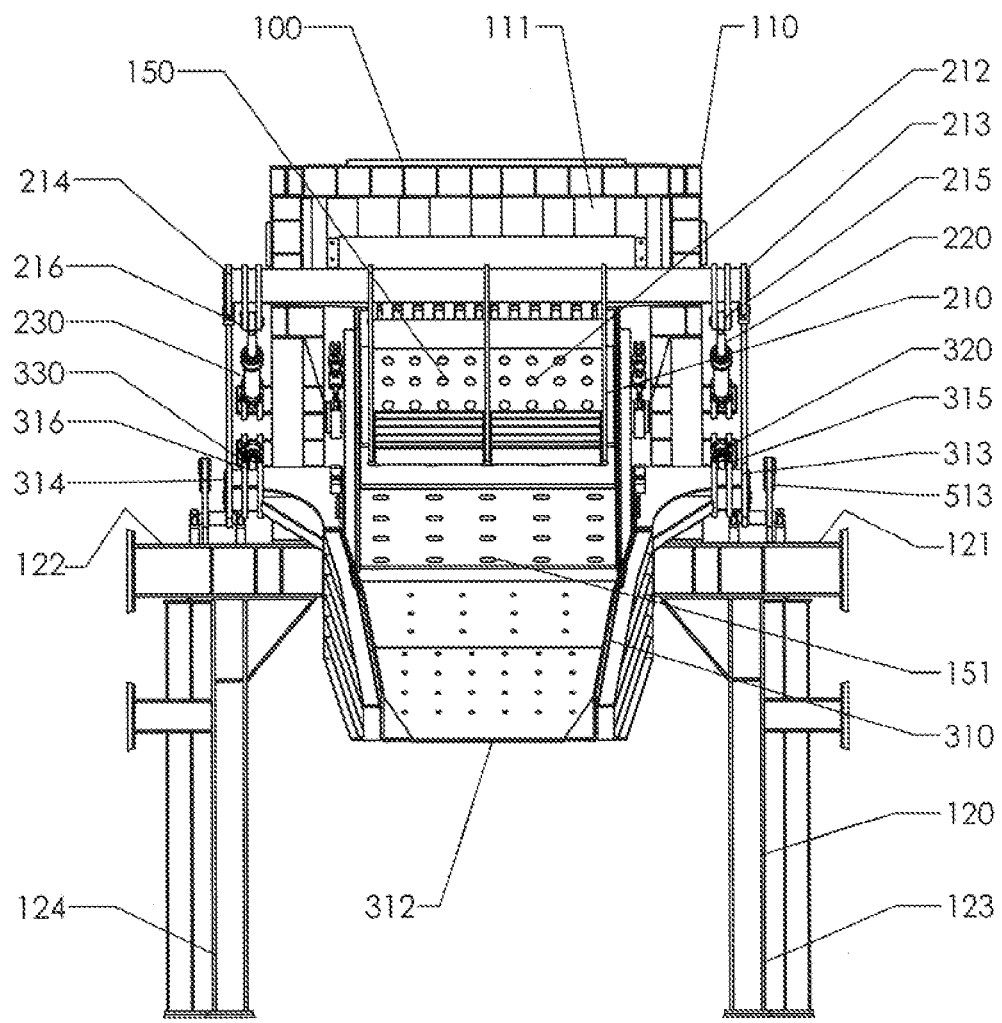
FIG. 4 is a front view of the ore chute system of FIG. 2.

FIG. 1 is a right side view illustrating an ore chute system 100, the chute press gate 210 being in a closed position 211, and the chute lip 310 being in a raised position 311, in accordance with an embodiment of the application. FIG. 2 is a right side view illustrating the ore chute system 100 of FIG. 1, the chute press gate 210 being in an opened position 212, and the chute lip 310 being in a lowered position 312, in accordance with an embodiment of the application. FIG. 3 is a front view of the ore chute system 100 of FIG. 1. And, FIG. 4 is a front view of the ore chute system 100 of FIG. 2.

The ore chute system 100 may include: a chute box 110 for receiving and storing ore or other material (not shown) from, for example, an ore pass; a chute or chute opening 150 formed in the chute box 110 for the unloading and removal of the ore or other material from the chute box 110; a chute press gate system 200 mounted to the chute box 110 and including a press gate 210 sized for mounting over the chute opening 150 to selectively close the chute opening 150 to secure the ore or other material in the chute box 110; a chute lip system 300 mounted to the chute box 110 below the chute opening 150 and including a chute lip 310 moveable to control and direct the flow of ore or other material exiting the chute box 110 though the chute opening 150 when the chute press gate 210 is in an opened position 212; and, a counterweight system 500 for the failsafe closure of the chute press gate 210 and raising of the chute lip 310 in the event of failure of one or more actuators 220, 230, 320, 330 associated with the chute press gate system 200 and the chute lip system 300.

The chute box 110 may include opposed and spaced front (or first) and rear (or second) end walls 111, 112 coupled (or joined, fastened, bolted, welded, etc.) to opposed and spaced right (or first) and left (or second) side walls 113, 114 all of which may be coupled to a floor or base 115. The chute box 110 may be mounted to a chute support frame 120 coupled to an outer surface of the base 115. The chute box 100 may be open at the top 116 (or may have a top opening 117 formed at the top 116 thereof) for receiving the ore or other material.

The chute box 110 may be used for receiving and storing ore or other material which may be loaded or placed within the chute box 110 through the open top 116 or top opening 117, that is, within the volume 118 defined by the inner surfaces of the end walls 111, 112, the inner surfaces of the side walls 113, 114, the inner surface of the base 115, and the inner surface of the press gate 210 (i.e., inside 119 the chute box 110). According to one embodiment, the chute box 110 may be constructed using steel, aluminum, and/or other metal.

The chute or chute opening 150 may be formed in the front end wall 111 of the chute box 110. The chute 150 may have a chute table extension 151 associated therewith and mounted to the front end wall 111 below the chute opening 150 to direct the ore or other material in the chute box 110 through the chute lip 310. Similarly, the chute opening 150 may have a funnel structure or chute structure (not shown) associated therewith for also directing the ore or other material in the chute box 110 away from the chute box 110 and/or through the chute lip 310. According to one embodiment, the chute opening 150 may be formed in the base 115 of the chute box 110.

The chute press gate system 200 includes the chute press gate 210, right (or first) and left (or second) chute press gate hydraulic cylinders 220, 230, and a chute press gate control system (not shown). The chute press gate 210 is mounted to the front end wall 111 of the chute box 110 to selectively open and close the chute opening 150. The chute gate press gate 210 may be axle or hinge 250 mounted to the front end wall 111 above the chute opening 150. By way of operation of the right and left chute press gate hydraulic cylinders 220, 230 under the control of the chute press gate control system, the chute press gate 210 is moveable between a closed position 211 and an opened position 212 by rotation about its axle or hinge 250. The right and left chute press gate hydraulic cylinders 220, 230 are coupled (e.g., by pin, etc.) to the right (of first) and left (or second) sides 213, 214 of the chute press gate 210 at positions 215, 216 spaced from the axle or hinge 250, respectively, at one end (e.g., the piston rod end) and to right and left side walls 113, 114 of the chute box 110, respectively, at the other end (e.g., at the cylinder barrel end). In the closed position 211, the chute press gate 210 prevents ore or other material from exiting the chute box 110 through the chute opening 150. In the opened position 212, the chute press gate 210 allows ore or other material to exit the chute box 110 through the chute opening 150. According to one embodiment, each of the right and left chute press gate hydraulic cylinders 220, 230 may be another type of actuator such as a pneumatic or electric actuator.

The chute lip system 300 includes the chute lip 310, right (or first) and left (or second) chute lip hydraulic cylinders 320, 330, and a chute lip control system (not shown). The chute lip 310 is mounted to the front end wall 111 of the chute box 110 and may be selectively raised and lowered in front of the chute opening 150. The chute lip 310 may be axle or hinge 350 mounted to the front end wall 111 below the chute opening 150. By way of operation of the right and left chute lip hydraulic cylinders 320, 330 under the control of the chute lip control system, the chute lip 310 is moveable between a raised (or closed) position 311 and a lowered (or opened) position 312 by rotation about its axle or hinge 350. The right and left chute lip hydraulic cylinders 320, 330 are coupled (e.g., by pin, etc.) to the right and left sides 313, 314 of the chute lip 310 at positions 315, 316 spaced from the axle or hinge 350, respectively, at one end (e.g., the piston rod end) and to right and left side walls 113, 114 of the chute box 110, respectively, at the other end (e.g., at the cylinder barrel end). In the raised (or closed) position 311, the chute lip 210 helps prevent ore or other material from exiting the chute box 110 through the chute opening 150. In the lowered (or opened) position 312, the chute lip 310 allows ore or other material to exit the chute box 110 through the chute opening 150. According to one embodiment, each of the right and left chute lip cylinders 320, 330 may be another type of actuator such as a pneumatic or electric actuator.

Figure 5:
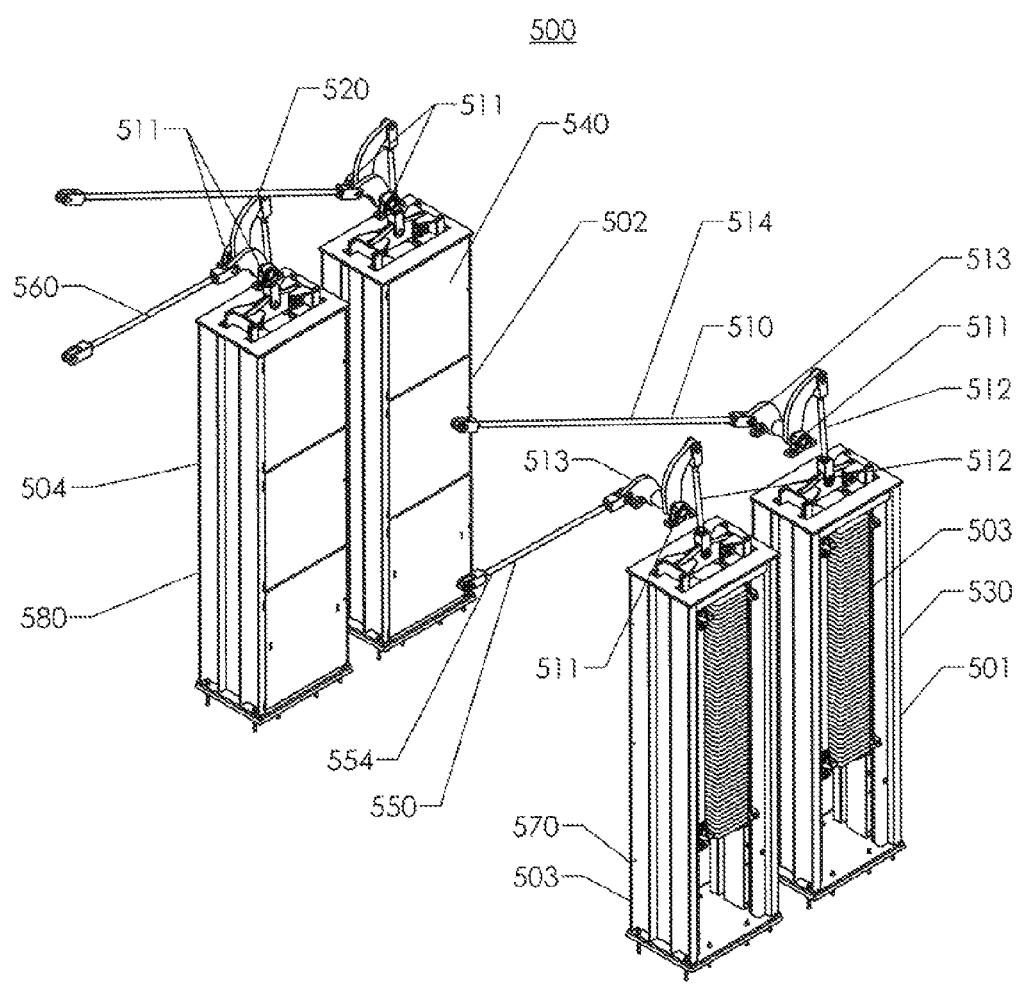
FIG. 5 is a front perspective view illustrating a counterweight system of the ore chute system of FIG. 1, in accordance with an embodiment of the application.
Figure 38:
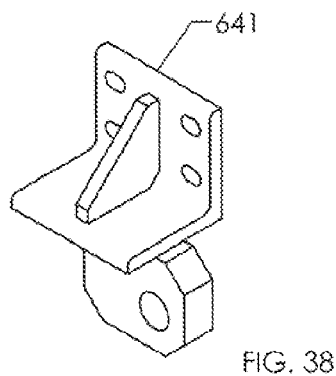
FIG. 38 is a front perspective view illustrating a right roller bracket of the counterweight assembly of FIG. 6, in accordance with an embodiment of the application.
Figure 41:
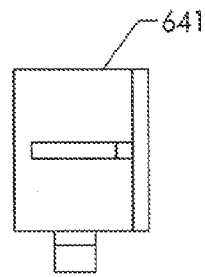
FIG. 41 is a top view illustrating the right roller bracket of FIG. 38.
Figure 39:
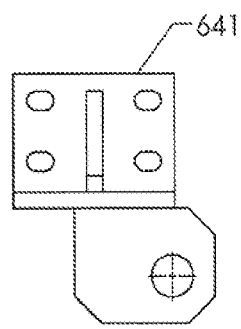
FIG. 39 is a left side view illustrating the right roller bracket of FIG. 38.
Figure 40:
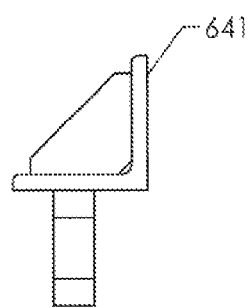
FIG. 40 is a front view illustrating the right roller bracket of FIG. 38.
Figure 43:
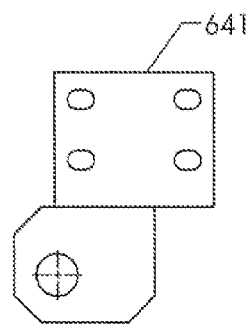
FIG. 43 is a right side view illustrating the right roller bracket of FIG. 38.
Figure 42:
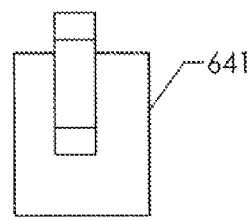
FIG. 42 is a bottom view illustrating the right roller bracket of FIG. 38.
Figure 47:
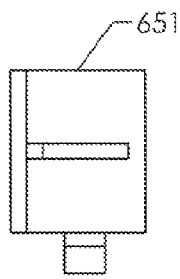
FIG. 47 is a top view illustrating the left roller bracket of FIG. 44.
Figure 44:
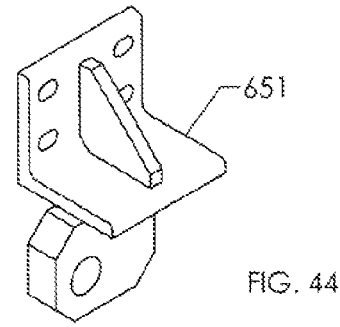
FIG. 44 is a front perspective view illustrating a left roller bracket of the counterweight assembly of FIG. 6, in accordance with an embodiment of the application.
Figure 45:
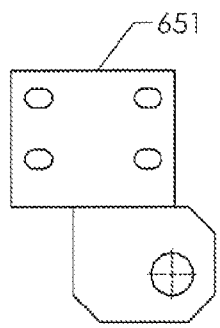
FIG. 45 is a left side view illustrating the left roller bracket of FIG. 44.
Figure 46:
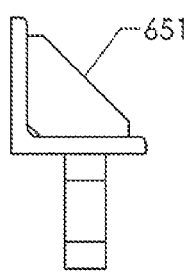
FIG. 46 is a front view illustrating the left roller bracket of FIG. 44.
Figure 49:
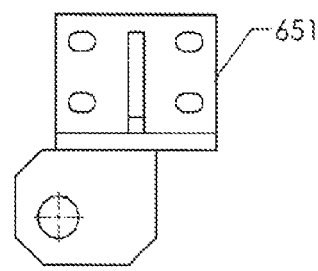
FIG. 49 is a right side view illustrating the left roller bracket of FIG. 44.
Figure 48:
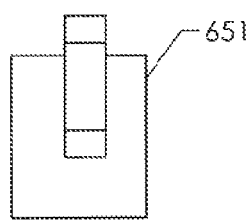
FIG. 48 is a bottom view illustrating the left roller bracket of FIG. 44.
Figure 50:
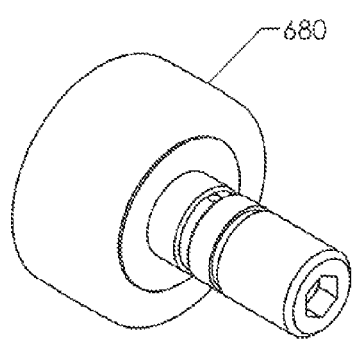
FIG. 50 is a front perspective view illustrating a cam follower roller of the counterweight assembly of FIG. 6, in accordance with an embodiment of the application.
Figure 51:
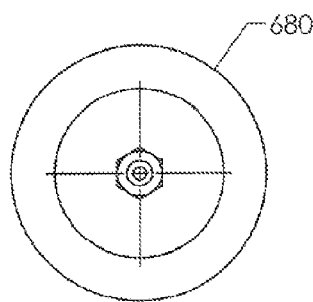
FIG. 51 is a left side view illustrating the cam follower roller of FIG. 50.
Figure 52:
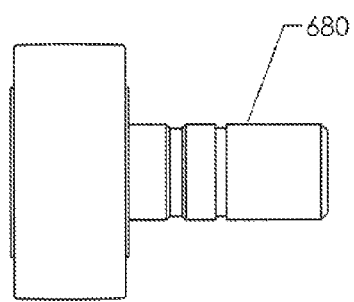
FIG. 52 is a front view illustrating the cam follower roller of FIG. 50.
Figure 53:
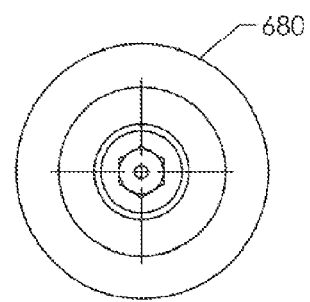
FIG. 53 is a right side view illustrating the cam follower roller of FIG. 50.
Figure 57:
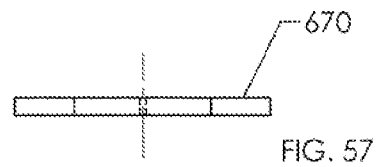
FIG. 57 is a top view illustrating the counterweight plate of FIG. 54.
Figure 55:
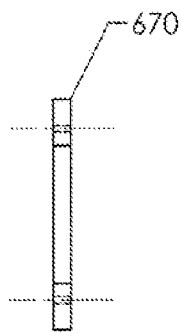
FIG. 55 is a left side view illustrating the counter weight plate of FIG. 54.
Figure 56:
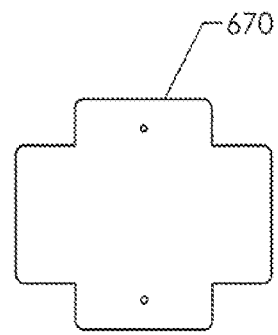
FIG. 56 is a front view illustrating the counterweight plate of FIG. 54.
Figure 60:
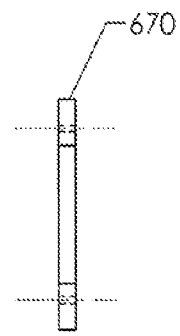
FIG. 60 is a right side view illustrating the counterweight plate of FIG. 54.
Figure 58:
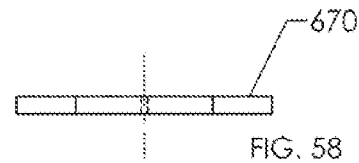
FIG. 58 is a bottom view illustrating the counterweight plate of FIG. 54.
Figure 54:
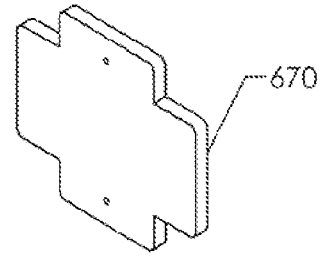
FIG. 54 is a front perspective view illustrating a counterweight plate of the counterweight assembly of FIG. 6, in accordance with an embodiment of the application.
Figure 59:
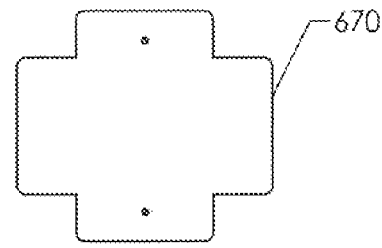
FIG. 59 is a rear side view illustrating the counterweight plate of FIG. 54.
Figure 61:
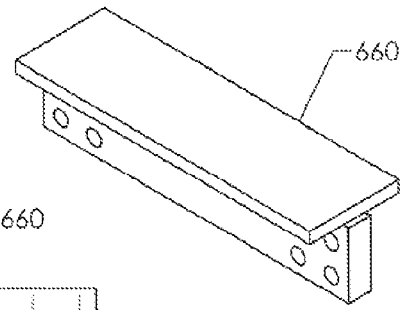
FIG. 61 is a front perspective view illustrating a counterweight support bracket of the counterweight assembly of FIG. 6, in accordance with an embodiment of the application.
Figure 64:
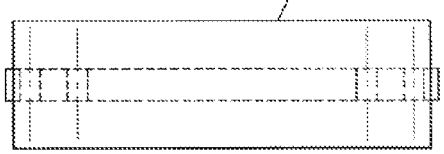
FIG. 64 is a top view illustrating the counterweight support bracket of FIG. 61.
Figure 62:
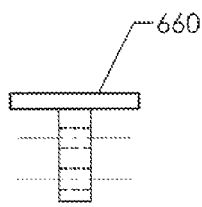
FIG. 62 is a left side view illustrating the counterweight support bracket of FIG. 61.
Figure 63:
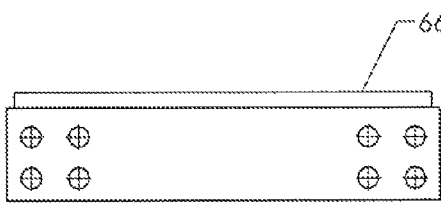
FIG. 63 is a front view illustrating the counterweight support bracket of FIG. 61.
Figure 66:
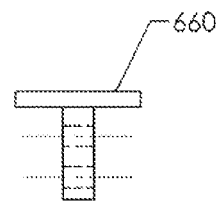
FIG. 66 is a right side view illustrating the counterweight support bracket of FIG. 61.
Figure 65:
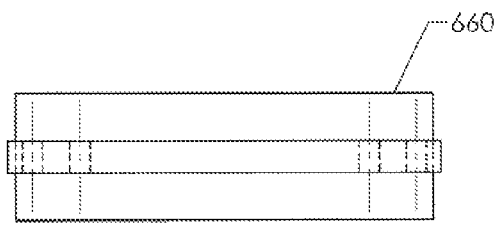
FIG. 65 is a bottom view illustrating the counterweight support bracket of FIG. 61.
Figure 67:
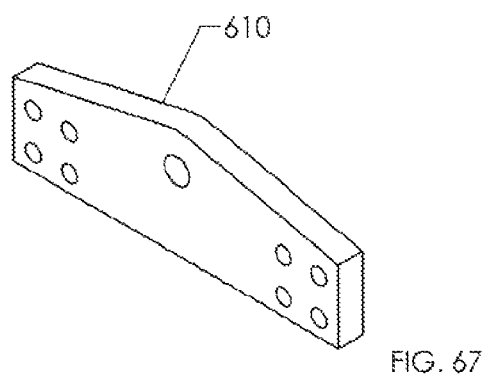
FIG. 67 is a front perspective view illustrating a lift plate of the counterweight assembly of FIG. 6, in accordance with an embodiment of the application.
Figure 70:
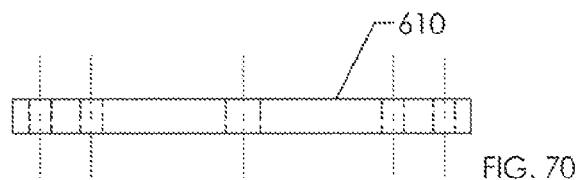
FIG. 70 is a top view illustrating the lift plate of FIG. 67.
Figure 68:
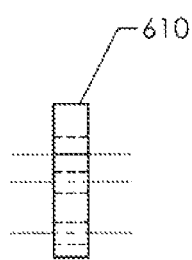
FIG. 68 is a left side view illustrating the lift plate of FIG. 67.
Figure 69:
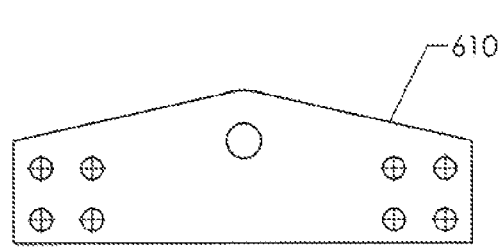
FIG. 69 is a front view illustrating the lift plate of FIG. 67.
Figure 72:
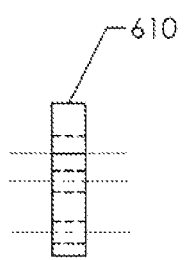
FIG. 72 is a right side view illustrating the lift plate of FIG. 67.
Figure 71:
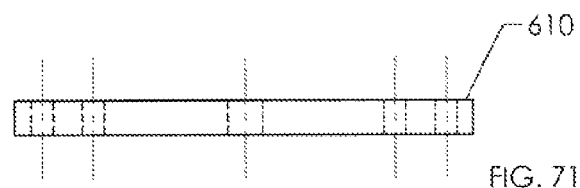
FIG. 71 is a bottom view illustrating the lift plate of FIG. 67.
Figure 73:
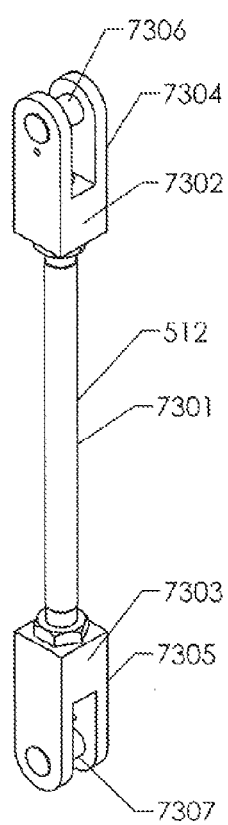
FIG. 73 is a front perspective view illustrating a counterweight connecting rod assembly of the counterweight system of FIG. 5, in accordance with an embodiment of the application.
Figure 76:
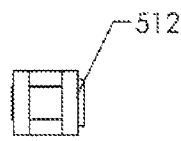
FIG. 76 is a top view illustrating the counterweight connecting rod assembly of FIG. 73.
Figure 74:
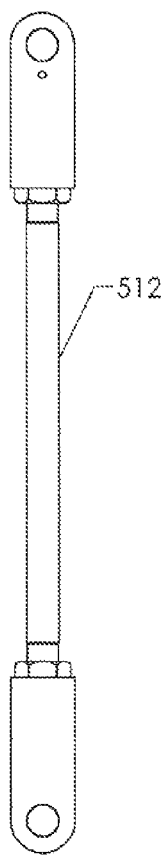
FIG. 74 is a left side view illustrating the counterweight connecting rod assembly of FIG. 73.
Figure 75:
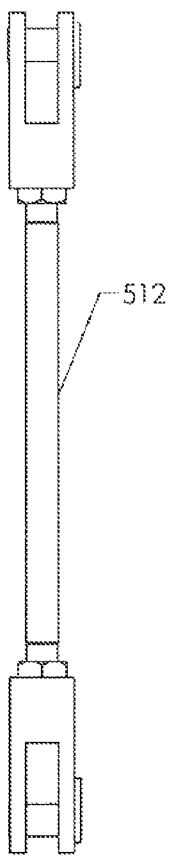
FIG. 75 is a front view illustrating the counterweight connecting rod assembly of FIG. 73.
Figure 78:
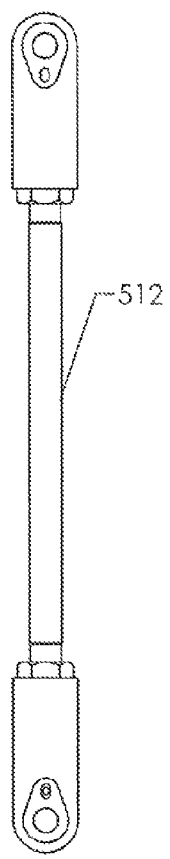
FIG. 78 is a right side view illustrating the counterweight connecting rod assembly of FIG. 73.
Figure 77:
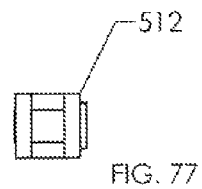
FIG. 77 is a bottom view illustrating the counterweight connecting rod assembly of FIG. 73.
Figure 79:
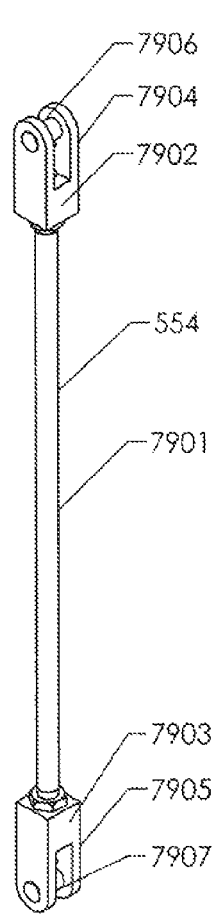
FIG. 79 is a front perspective view illustrating a chute lip connecting rod assembly of the counterweight system of FIG. 5, in accordance with an embodiment of the application.
Figure 82:
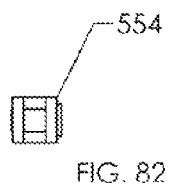
FIG. 82 is a top view illustrating the chute lip connecting rod assembly of FIG. 79.
Figure 80:
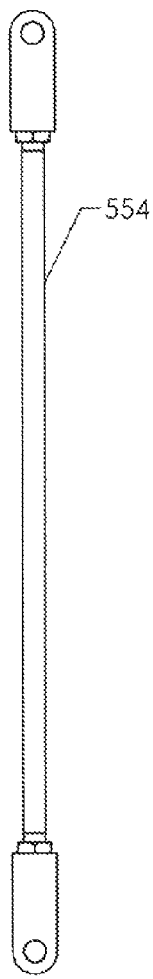
FIG. 80 is a left side view illustrating the chute lip connecting rod assembly of FIG. 79.
Figure 81:
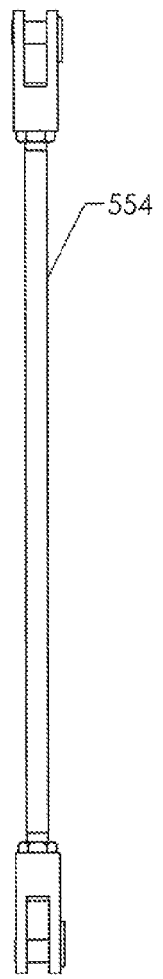
FIG. 81 is a front view illustrating the chute lip connecting rod assembly of FIG. 79.
Figure 84:
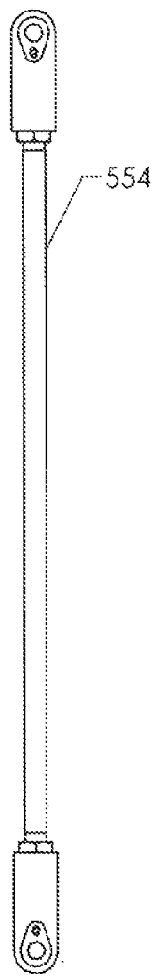
FIG. 84 is a right side view illustrating the chute lip connecting rod assembly of FIG. 79.
Figure 83:
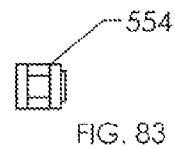
FIG. 83 is a bottom view illustrating the chute lip connecting rod assembly of FIG. 79.
Figure 97:
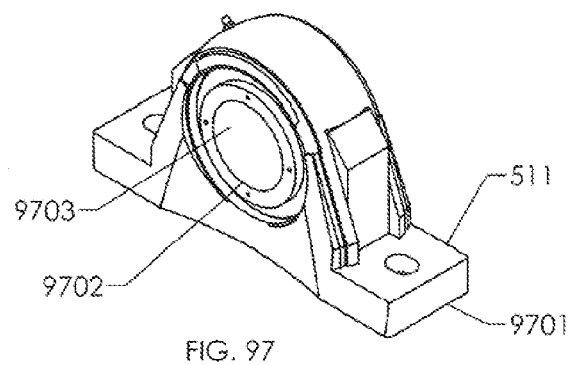
FIG. 97 is a front perspective view illustrating a pillow block bearing assembly of the counterweight system of FIG. 5, in accordance with an embodiment of the application.
Figure 100:
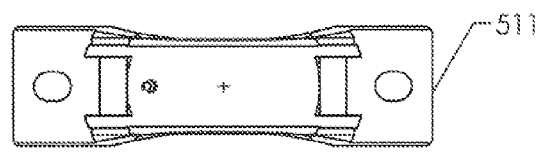
FIG. 100 is a top view illustrating the pillow block bearing assembly of FIG. 97.
Figure 98:
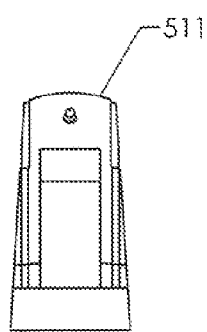
FIG. 98 is a left side view illustrating the pillow block bearing assembly of FIG. 97.
Figure 99:
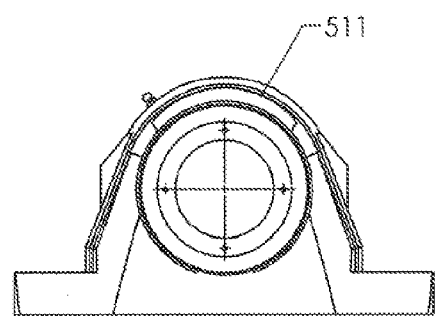
FIG. 99 is a front view illustrating the pillow block bearing assembly of FIG. 97.
Figure 102:
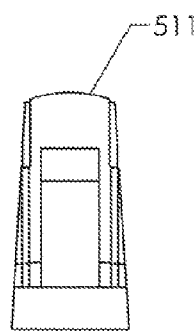
Figure 101:
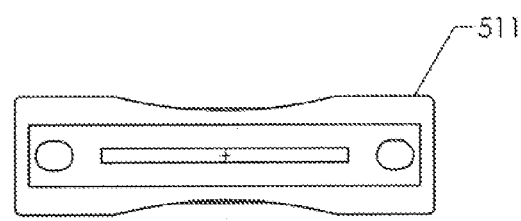
FIG. 101 is a bottom view illustrating the pillow block bearing assembly of FIG. 97; and, FIG. 102 is a right side view illustrating the pillow block bearing assembly of FIG. 97.

FIG. 5 is a front perspective view illustrating a counterweight system 500 of the ore chute system 100 of FIG. 1, in accordance with an embodiment of the application.

The counterweight system 500 includes: right (or first) and left (or second) chute press gate counterweight systems 501, 502; and, right (or first) and left (or second) chute lip counterweight systems 503, 504. Referring again to FIGS. 1-2, the right and left chute press gate counterweight systems 501, 502 and the right and left chute lip counterweight systems 503, 504 are associated with or form part of the chute press gate system 300 and the chute lip system 200, respectively.

The right and left chute press gate counterweight systems 501, 502 include right (or first) and left (or second) chute press gate linkage assemblies 510, 520 coupled to right (or first) and left (or second) chute press gate counterweight assemblies 530, 540, respectively. The right and left chute lip counterweight systems 503, 504 include right (or first) and left (or second) chute lip linkage assemblies 550, 560 coupled to right (or first) and left (or second) chute lip counterweight assemblies 570, 580, respectively.

The right chute press gate linkage assembly 510 and the right chute lip linkage assembly 550 may be mounted to a right (or first) side 121 of the upper surface of the chute support frame 120 adjacent the right side wall 113 of the chute box 110 via respective pairs of pillow block bearing assemblies 511. The left chute press gate linkage assembly 520 and the left chute lip linkage assembly 560 may be mounted to a left (or second) side 122 of the upper surface of the chute support frame 120 adjacent the left side wall 114 of the chute box 110 via respective pairs of pillow block bearing assemblies 511. The right chute press gate counterweight assembly 530 and the right chute lip counterweight assembly 570 may be mounted to a right (or first) side 123 of the chute support frame 120 below the right side wall 113 of the chute box 110. The left chute press gate counterweight assembly 540 and the left chute lip counterweight assembly 560 may be mounted to a left (or second) side 124 of the chute support frame 120 below the left side wall 114 of the chute box 110.

The right chute press gate linkage assembly 510 includes: a counterweight connecting rod assembly 512 (see FIGS. 73-78); a lever arm assembly 513 (see FIGS. 91-96); a pair of pillow block bearing assemblies 511 (see FIGS. 97-102); and, a chute press gate connecting rod assembly 514 (see FIGS. 85-90).

Referring to FIGS. 73-78, the counterweight connecting rod assembly 512 includes a rod 7301 coupled to a first or upper yoke 7302 at a first or upper end 7304 and to a second or lower yoke 7303 at a second or lower end 7305. Each of the upper and lower yokes 7302, 7303 has a respective pin 7306, 7307 for coupling the counterweight connecting rod assembly 512 to other components.

Referring to FIGS. 91-96), the lever arm assembly 513 includes a shaft or axle 9103 to which is mounted a first or long lever arm 9102 at a first end 9105 and a second or short lever arm 9101 at a second end 9104. The ratio of the lengths of the long lever arm 9102 to the short lever arm 9101 may be 2:1. The lever arm assembly 513 therefore provides a mechanical advantage. The lever arm assembly 513 operates much like a bell crank translating vertical motion of the counterweight connecting rod assembly 512 into horizontal motion of the chute press gate connecting rod assembly 514.

Referring to FIGS. 97-102, each pillow block bearing assembly 511 includes a housing 9701 having a hole 9703 formed therein for fitting a bearing 9702 (e.g., a ball bearing) for receiving a shaft or axle (i.e., the shaft or axle 9103 of the lever arm assembly 513).

Referring to FIGS. 85-90, the chute press gate connecting rod assembly 514 includes a rod 8501 coupled to a first or forward yoke 8502 at a first or forward end 8504 and to a second or rearward yoke 8503 at a second or rearward end 8505. Each of the forward and rearward yokes 8502, 8503 has a respective pin 8506, 8507 for coupling the chute press gate connecting rod assembly 514 to other components.

Referring again to FIG. 5, the counterweight connecting rod assembly 512 of the right chute press gate linkage assembly 510 is coupled (e.g., by pin 7307, etc.) at the lower end 7305 to a lift plate 610 of the right chute press gate counterweight assembly 530 and at the upper end 7304 (e.g., by pin 7306, etc.) to the short arm 9101 of the lever arm assembly 513. The chute press gate connecting rod assembly 514 of the right chute press gate linkage assembly 510 is coupled (e.g., by pin 8507, etc.) at the rearward end 8505 to the long arm 9102 of the lever arm assembly 530 and at the forward end 8504 (e.g., by pin 8506, etc.) to the right side 213 of the chute press gate 210.

The right chute lip linkage assembly 550 includes: a counterweight connecting rod assembly 512 (see description above and FIGS. 73-78); a lever arm assembly 513 (see description above and FIGS. 91-96); a pair of pillow block bearing assemblies 511 (see description above and FIGS. 97-102); and, a chute lip connecting rod assembly 554 (see FIGS. 79-84).

Referring to FIGS. 79-84, the chute lip connecting rod assembly 554 includes a rod 7901 coupled to a first or forward yoke 7902 at a first or forward end 7904 and to a second or rearward yoke 7903 at a second or rearward end 7905. Each of the forward and rearward yokes 7902, 7903 has a respective pin 7906, 7907 for coupling the chute lip connecting rod assembly 554 to other components.

Referring again to FIG. 5, the counterweight connecting rod assembly 512 of the right chute lip linkage assembly 550 is coupled (e.g., by pin 7307, etc.) at the lower end 7305 to a lift plate 610 of the right chute lip counter weight assembly 570 and at the upper end 7304 (e.g., by pin 7306, etc.) to the short arm 9101 of the lever arm assembly 513. The chute lip connecting rod assembly 554 of the right chute lip linkage assembly 550 is coupled (e.g., by pin 7907, etc.) at the rearward end 7905 to the long arm 9102 of the lever arm assembly 530 and at the forward end 7904 (e.g., by pin 7906, etc.) to the right side 313 of the chute lip 310.

FIG. 6 is a front perspective view illustrating a counterweight assembly (e.g., the right press gate counterweight assembly 530) of the counter weight system 500 of FIG. 5, in accordance with an embodiment of the application.

The counterweight assembly 530 includes a counterweight carriage 630 movable within a counter weight frame 620 from a lowered position 631 as shown in FIG. 1 to a raised position 632 as shown in FIG. 2.

Referring to FIGS. 23-72, the counter weight carriage 630 includes a first or right elongate counterweight guide 640 (see FIGS. 22-29) coupled to a second or left elongate counter weight guide 650 (see FIGS. 30-37) by a lift plate 610 (see FIGS. 67-72) at a first or upper end 633 and by a support bracket 660 (see FIGS. 61-66) at a second or lower end 634. A configurable number of counterweight plates 670 (see FIGS. 54-60) are fitted between the guides 640, 650 and supported by the support bracket 660 of the counterweight carriage 630. The number of counterweight plates 670 installed in each counterweight carriage 630 is a function of the force required or selected to be applied to close the chute press gate 210 and to raise the chute lip 310. Proximate the upper end 633 and the lower end 634 of each side of each guide 640, 650 are mounted respective roller brackets 641, 651 (see FIGS. 39-43 and FIGS. 44-49) for receiving and supporting respective guide or cam follower rollers 680 (see FIGS. 50-53).

Referring to FIGS. 14-21, the inner surfaces of the left and right walls of the counterweight frame 620 include respective grooves, tracks, or guides 621 for receiving and guiding the guide or cam follower rollers 680 of the counter weight carriage 630 allowing the carriage 630 to move smoothly between its lowered position 631 and its raised position 632. The counterweight frame 620 may be provided with one or more access doors 1500 on its front and/or rear sides.

The left chute press gate linkage assembly 520 is configured similarly to the right chute press gate linkage assembly 510 (i.e., mirror images); the left chute lip linkage assembly 560 is configured similarly to the right chute lip linkage assembly 550; and, the left chute press gate counterweight assembly 540, the right chute lip counterweight assembly 570, and the left chute lip counterweight assembly 580 are configured similarly to the right chute press gate counterweight assembly 530.

In operation, when moving from the chute press gate's opened position 212 to its closed position 211, the piston rod of each hydraulic cylinder 220, 230 is urged into its respective cylinder barrel by fluid pressure causing the chute press gate 210 to be pulled closed and the chute press gate connecting rod assemblies 514 coupled to the chute press gate 210 to be urged rearward (i.e., toward the rear wall 112 of the chute box 110). The rearward movement of the chute press gate connecting rod assemblies 514 is translated by the respective lever arm assemblies 513 coupled thereto into downward movement of the respective counterweight connecting rod assemblies 512 coupled thereto. The downward movement of the counterweight connecting rod assemblies 512 in turn moves the respective counterweight carriages 630 coupled thereto from their raised positions 632 to their lowered positions 631 within their respective counterweight frames 620. The counterweight carriages 630 may travel a vertical or approximately vertical distance of approximately 1 m between their raised positions 632 and their lowered positions 631.

When moving from the chute press gate's closed position 211 to its opened position 212, the piston rod of each hydraulic cylinder 220, 230 is urged out of its respective cylinder barrel by fluid pressure causing the chute press gate 210 to be pushed open and the chute press gate connecting rod assemblies 514 coupled to the chute press gate 210 to be urged forward (i.e., toward the front wall 111 of the chute box 110). The forward movement of the chute press gate connecting rod assemblies 514 is translated by the respective lever arm assemblies 513 coupled thereto into upward movement of the respective counterweight connecting rod assemblies 512 coupled thereto. The upward movement of the counterweight connecting rod assemblies 512 in turn moves the respective counterweight carriages 630 coupled thereto from their lowered positions 631 to their raised positions 632 within their respective counterweight frames 620. The counterweight carriages 630 may travel a vertical or approximately vertical distance of approximately 1 m between their lowered positions 631 and their raised lowered positions 632.

Thus, when the chute press gate 210 is in its opened position 212, the hydraulic cylinders 220, 230 hold the respective counterweight carriages 630 in their raised positions 632 by overcoming the force of gravity acting upon the carriages 630. Upon loss of power or pressure to the hydraulic cylinders 220, 230, the force of gravity acting upon the carriages 630 cause them to travel from their raised positions 632 to their lowered positions 631 thus pulling the chute press gate 210 to its closed position 211 via the chute press gate linkage assemblies 510, 520.

Similarly, when moving from the chute lip's lowered (or opened) position 312 to its raised (or closed) position 311, the piston rod of each hydraulic cylinder 320, 330 is urged into its respective cylinder barrel by fluid pressure causing the chute lip 310 to be pulled up (or closed) and the chute lip connecting rod assemblies 554 coupled to the chute lip 310 to be urged rearward. The rearward movement of the chute lip connecting rod assemblies 554 is translated by the respective lever arm assemblies 513 coupled thereto into downward movement of the respective counterweight connecting rod assemblies 512 coupled thereto. The downward movement of the counterweight connecting rod assemblies 512 in turn moves the respective counterweight carriages 630 coupled thereto from their raised positions 632 to their lowered positions 631 within their respective counterweight frames 620. The counterweight carriages 630 may travel a vertical or approximately vertical distance of approximately 1 m between their raised positions 632 and their lowered positions 631.

When moving from the chute lip's raised (or closed) position 311 to its lowered (or opened) position 312, the piston rod of each hydraulic cylinder 320, 330 is urged out of its respective cylinder barrel by fluid pressure causing the chute lip 310 to be pushed down (or opened) and the chute lip connecting rod assemblies 554 coupled to the chute lip 310 to be urged forward. The forward movement of the chute lip connecting rod assemblies 554 is translated by the respective lever arm assemblies 513 coupled thereto into upward movement of the respective counterweight connecting rod assemblies 512 coupled thereto. The upward movement of the counterweight connecting rod assemblies 512 in turn moves the respective counterweight carriages 630 coupled thereto from their lowered positions 631 to their raised positions 632 within their respective counterweight frames 620. The counterweight carriages 630 may travel a vertical or approximately vertical distance of approximately 1 m between their lowered positions 631 and their raised lowered positions 632.

Thus, when the chute lip 310 is in its lowered (or opened) position 312, the hydraulic cylinders 320, 330 hold the respective counterweight carriages 630 in their raised positions 632 by overcoming the force of gravity acting upon the carriages 630. Upon loss of power or pressure to the hydraulic cylinders 320, 330, the force of gravity acting upon the carriages 630 cause them to travel from their raised positions 632 to their lowered positions 631 thus pulling the chute lip 310 to its raised (or closed) position 311 via the chute lip linkage assemblies 550, 570.

Referring again to FIGS. 1-6, the counterweight system 500 includes connecting rod assemblies 514 that are connected to weight reducing lever arm assemblies 513 which are in turn connected to counterweight carriages 630. The counterweight carriages 630 include a number of stacked counterweight plates 670 which provide the required closing and raising forces for the chute press gate 210 and chute lip 310, respectively. The operator of the ore chute system 100 uses one or more control systems to control the operation of the hydraulic (or pneumatic or electric) cylinders 220, 230, 320, 330 to operate the chute press gate 210 and chute lip 310. The force exerted by the hydraulic cylinders 220, 230, 320, 330 is such that it overcomes the gravitational force acting on the counterweight carriages 630 and thereby opens the chute press gate 210 and/or raises the chute lip 310. Should a failure occur such as a loss of hydraulic or pneumatic pressure, loss of electrical power, or the failure of a hydraulic cylinder 220, 230, 320, 330, the gravitational force acting on the counterweight carriages 630 will cause their movement to their lowered positions 631 hence closing the chute press gate 210 and raising the chute lip 310. The counterweight carriages 630 have guide or cam follower rollers 680 which ensure they are free to lift and drop with little resistance within their respective counterweight frames 620.

According to one embodiment, the number of counterweight plates 670 installed in each counterweight carriage 630 may be selected to assist the hydraulic actuators 220, 230, 320, 330 with the closing of the chute press gate 210 and raising of the chute lip 310 rather than to fully replace the action of the hydraulic actuators 220, 230, 320, 330.

According to one embodiment, respective cable and pulley assemblies may be used in place of the chute press gate linkage and chute lip linkage assemblies 510, 520, 550, 560.

According to one embodiment, the ore chute system 100 may be equipped with: only one of the right and left chute press gate counterweight systems 501, 502; only one of the right and left chute lip counterweight systems 503, 504; only one of the right and left chute press gate hydraulic cylinders 220, 230; only one of the right and left chute lip hydraulic cylinders 320, 330; and/or, only one of the chute press gate 210 and chute lip 310.

Thus, according to one embodiment, there is provided an ore chute system 100, comprising: a chute box 110 for collecting material and having a chute opening 150 formed therein for discharging the material therethrough; a chute press gate 210 mounted over the chute opening 150 and moveable between an opened position 212 to allow discharge of the material from the chute box 110 and a closed position 211 to prevent discharge of the material from the chute box 110; a chute press gate actuator 220 coupled to the chute press gate 210 and controllable to move the chute press gate 210 between the opened position 212 and the closed position 211; and, a chute press gate counterweight system 501 coupled to the chute press gate 210 and configured to move the chute press gate 210 from the opened position 212 to the closed position 211 upon failure of the chute press gate actuator 220.

In the above ore chute system 100, the chute press gate counterweight system 501 may include a chute press gate linkage assembly 510 coupling the chute press gate 210 to a counterweight assembly 530. The chute press gate linkage assembly 510 may include a chute press gate connecting rod assembly 514 coupled at a forward end (or first end) 8504 to the chute press gate 210 and at a rearward end (or second end) 8505 to a first arm 9102 of a lever arm assembly 513, the lever arm assembly 513 having a second arm 9101 coupled to an upper end (or first end) 7304 of a counterweight connecting rod assembly 512, a lower end (or second end) 7305 of the counterweight connecting rod assembly 512 coupled to a counterweight carriage 630 of the counterweight assembly 530. The counterweight carriage 630 may be movable within a counterweight frame 620 of the counterweight assembly 530 between a raised position 632 and a lowered position 631. Movement of the chute press gate 210 between the opened position 212 and the closed position 211 may be translated by the chute press gate linkage assembly 510 into movement of the counterweight carriage 630 between the raised position 632 and the lowered position 631, respectively, and vise versa. The counterweight carriage 630 may include at least one counterweight plate 670, the at least one counterweight plate 670 having a mass selected to provide a force sufficient to move the chute press gate 210 from the opened position 212 to the closed position 211 upon failure of the chute press gate actuator 220. The lever arm assembly 513 may include an axle (or shaft) 9103 and the first arm 9102 and the second arm 9101 of the lever arm assembly 9103 may be offset and may be mounted to respective ends 9105, 9104 of the axle 9103. The first arm 9102 may have a first length, the second arm 9101 may have a second length, and the first length may be greater than the second length, whereby the lever arm assembly 513 provides a mechanical advantage. The chute press gate actuator 220 may be coupled between the chute press gate 210 and the chute box 110. The chute press gate actuator 220 may be a hydraulic cylinder. The chute box 110 may be mounted on a chute support frame 120 and the counterweight assembly 530 may be mounted to the chute support frame 120. And, the chute press gate actuator 220 may be at least one chute press gate actuator 220, 230 and the chute press gate counterweight system 501 may be at least one chute press gate counterweight system 501, 502.

The above ore chute system 100 may further include: a chute lip 310 mounted below the chute opening 150 and moveable between a lowered position 312 to allow discharge of the material from the chute box 110 and a raised position 311 to prevent discharge of the material from the chute box 110; a chute lip actuator 320 coupled to the chute lip 310 and controllable to move the chute lip 310 between the lowered position 312 and the raised position 311; and, a chute lip counterweight system 503 coupled to the chute lip 310 and configured to move the chute lip 310 from the lowered position 312 to the raised position 311 upon failure of the chute lip actuator 320. The chute lip counterweight system 503 may include a chute lip linkage assembly 550 coupling the chute lip 310 to a counterweight assembly 570. The chute lip linkage assembly 550 may include a chute lip connecting rod assembly 554 coupled at a forward end (or first end) 7904 to the chute lip 310 and at a rearward end (or second end) 7905 to a first arm 9102 of a lever arm assembly 513, the lever arm assembly 513 having a second arm 9101 coupled to an upper end (or first end) 7304 of a counterweight connecting rod assembly 512, a lower end (or second end) 7305 of the counterweight connecting rod assembly 512 coupled to a counterweight carriage 630 of the counterweight assembly 570. The counterweight carriage 630 may be movable within a counterweight frame 620 of the counterweight assembly 570 between a raised position 632 and a lowered position 631. Movement of the chute lip 310 between the lowered position 312 and the raised position 311 may be translated by the chute lip linkage assembly 550 into movement of the counterweight carriage 630 between the raised position 632 and the lowered position 631, respectively, and vise versa. The counterweight carriage 630 may include at least one counterweight plate 670, the at least one counterweight plate 670 having a mass selected to provide a force sufficient to move the chute lip 310 from the lowered position 312 to the raised position 311 upon failure of the chute lip actuator 320. The lever arm assembly 513 may include an axle (or shaft) 9103 and the first arm 9102 and the second arm 9101 of the lever arm assembly 9103 may be offset and may be mounted to respective ends 9105, 9104 of the axle 9103. The first arm 9102 may have a first length, the second arm 9101 may have a second length, and the first length may be greater than the second length, whereby the lever arm assembly 513 provides a mechanical advantage. The chute lip actuator 320 may be coupled between the chute lip 310 and the chute box 110. The chute lip actuator 320 may be a hydraulic cylinder. The chute box 110 may be mounted on a chute support frame 120 and the counterweight assembly 570 may be mounted to the chute support frame 120. And, the chute lip actuator 320 may be at least one chute lip actuator 320, 330 and the chute lip counterweight system 503 may be at least one chute lip counterweight system 503, 504.

The above embodiments may contribute to an improved ore chute system 100 and may provide one or more advantages. First, in the event of failure of a hydraulic cylinder 220, 230, 320, 330, the counterweight system 500 operates to close and raise the chute press gate 210 and chute lip 310, respectively. Second, the counterweight system 500 maintains the chute press gate 210 in the closed position 211 and the chute lip 310 in the raised position 311 to reduce the chance of bleeding off due to leaking hydraulic cylinders 220, 230, 320, 330 or hoses. Third, the counterweight system 500, because it assists with the closing of the chute press gate 210 and the raising of the chute lip 310 using the force of gravity, may lower the power required to operate the hydraulic cylinders 220, 230, 320, 330 and the size of any back-up battery or power supply associated therewith. Fourth, the ore chute system 100 provides for failsafe closing/raising and locking of the chute press gate 210 and chute lip 310.

The embodiments of the application described above are intended to be exemplary only. Those skilled in this art will understand that various modifications of detail may be made to these embodiments, all of which come within the scope of the application.

What is claimed is:

1. An ore chute system, comprising:
   a chute box for collecting material and having a chute opening formed therein for discharging the material therethrough;
   a chute press gate mounted over the chute opening and moveable between an opened position to allow discharge of the material from the chute box and a closed position to prevent discharge of the material from the chute box;
   a chute press gate actuator coupled to the chute press gate and controllable to move the chute press gate between the opened position and the closed position; and,
   a chute press gate counterweight system coupled to the chute press gate and configured to move the chute press gate from the opened position to the closed position upon failure of the chute press gate actuator;
   wherein the chute press gate counterweight system includes a chute press gate linkage assembly coupling the chute press gate to a counterweight assembly; and
   wherein the chute press gate linkage assembly includes a chute press gate connecting rod assembly coupled at a forward end to the chute press gate and at a rearward end to a first arm of a lever arm assembly, the lever arm assembly having a second arm coupled to an upper end of a counterweight connecting rod assembly, a lower end of the counterweight connecting rod assembly coupled to a counterweight carriage of the counterweight assembly.

2. The ore chute system of claim 1, wherein the counterweight carriage is movable within a counterweight frame of the counterweight assembly between a raised position and a lowered position.

3. The ore chute system of claim 2, wherein movement of the chute press gate between the opened position and the closed position is translated by the chute press gate linkage assembly into movement of the counterweight carriage between the raised position and the lowered position, respectively, and vise versa.

4. The ore chute system of claim 3, wherein the counterweight carriage includes at least one counterweight plate, the at least one counterweight plate having a mass selected to provide a force sufficient to move the chute press gate from the opened position to the closed position upon failure of the chute press gate actuator.

5. The ore chute system of claim 1, wherein the lever arm assembly includes an axle and wherein the first arm and the second arm of the lever arm assembly are offset and are mounted to respective ends of the axle.

6. The ore chute system of claim 5, wherein the first arm has a first length, wherein the second arm has a second length, and wherein the first length is greater than the second length, whereby the lever arm assembly provides a mechanical advantage.

7. The ore chute system of claim 1, wherein the chute press gate actuator is coupled between the chute press gate and the chute box.

8. The ore chute system of claim 1, wherein the chute press gate actuator is a hydraulic cylinder.

9. The ore chute system of claim 1, wherein the chute box is mounted on a chute support frame and wherein the counterweight assembly is mounted to the chute support frame.

10. The ore chute system of claim 1, wherein the chute press gate actuator is at least one chute press gate actuator and wherein the chute press gate counterweight system is at least one chute press gate counterweight system.

11. The ore chute system of claim 1, further comprising:
a chute lip mounted below the chute opening and moveable between a lowered position to allow discharge of the material from the chute box and a raised position to prevent discharge of the material from the chute box;
a chute lip actuator coupled to the chute lip and controllable to move the chute lip between the lowered position and the raised position; and,
a chute lip counterweight system coupled to the chute lip and configured to move the chute lip from the lowered position to the raised position upon failure of the chute lip actuator.

12. The ore chute system of claim 11, wherein the chute lip counterweight system includes a chute lip linkage assembly coupling the chute lip to a counterweight assembly.

13. The ore chute system of claim 12, wherein the chute lip linkage assembly includes a chute lip connecting rod assembly coupled at a forward end to the chute lip and at a rearward end to a first arm of a lever arm assembly, the lever arm assembly having a second arm coupled to an upper end of a counterweight connecting rod assembly, a lower end of the counterweight connecting rod assembly coupled to a counterweight carriage of the counterweight assembly.

14. The ore chute system of claim 13, wherein the counterweight carriage is movable within a counterweight frame of the counterweight assembly between a raised position and a lowered position.

15. The ore chute system of claim 14, wherein movement of the chute lip between the lowered position and the raised position is translated by the chute lip linkage assembly into movement of the counterweight carriage between the raised position and the lowered position, respectively, and vise versa.

16. The ore chute system of claim 15, wherein the counterweight carriage includes at least one counterweight plate, the at least one counterweight plate having a mass selected to provide a force sufficient to move the chute lip from the lowered position to the raised position upon failure of the chute lip actuator.

17. The ore chute system of claim 13, wherein the lever arm assembly includes an axle and wherein the first arm and the second arm of the lever arm assembly are offset and are mounted to respective ends of the axle.

18. The ore chute system of claim 17, wherein the first arm has a first length, wherein the second arm has a second length, and wherein the first length is greater than the second length, whereby the lever arm assembly provides a mechanical advantage.

19. The ore chute system of claim 11, wherein the chute lip actuator is coupled between the chute lip and the chute box.

20. The ore chute system of claim 11, wherein the chute lip actuator is a hydraulic cylinder.

21. The ore chute system of claim 11, wherein the chute box is mounted on a chute support frame and wherein the counterweight assembly is mounted to the chute support frame.

22. The ore chute system of claim 11, wherein the chute lip actuator is at least one chute lip actuator and wherein the chute lip counterweight system is at least one chute lip counterweight system.

23. An ore chute system, comprising:
a chute box for collecting material and having a chute opening formed therein for discharging the material therethrough;
a chute press gate mounted over the chute opening and moveable between an opened position to allow discharge of the material from the chute box and a closed position to prevent discharge of the material from the chute box;
a chute press gate actuator coupled to the chute press gate and controllable to move the chute press gate between the opened position and the closed position;
a chute press gate counterweight system coupled to the chute press gate and configured to move the chute press gate from the opened position to the closed position upon failure of the chute press gate actuator;
a chute lip mounted below the chute opening and moveable between a lowered position to allow discharge of the material from the chute box and a raised position to prevent discharge of the material from the chute box;
a chute lip actuator coupled to the chute lip and controllable to move the chute lip between the lowered position and the raised position; and,
a chute lip counterweight system coupled to the chute lip and configured to move the chute lip from the lowered position to the raised position upon failure of the chute lip actuator.

24. The ore chute system of claim 23, wherein the chute lip counterweight system includes a chute lip linkage assembly coupling the chute lip to a counterweight assembly.

25. The ore chute system of claim 24, wherein the chute lip linkage assembly includes a chute lip connecting rod assembly coupled at a forward end to the chute lip and at a rearward end to a first arm of a lever arm assembly, the lever arm assembly having a second arm coupled to an upper end of a counterweight connecting rod assembly, a lower end of the counterweight connecting rod assembly coupled to a counterweight carriage of the counterweight assembly.

26. The ore chute system of claim 25, wherein the counterweight carriage is movable within a counterweight frame of the counterweight assembly between a raised position and a lowered position.

27. The ore chute system of claim 26, wherein movement of the chute lip between the lowered position and the raised position is translated by the chute lip linkage assembly into movement of the counterweight carriage between the raised position and the lowered position, respectively, and vise versa.

28. The ore chute system of claim 27, wherein the counterweight carriage includes at least one counterweight plate, the at least one counterweight plate having a mass selected to provide a force sufficient to move the chute lip from the lowered position to the raised position upon failure of the chute lip actuator.

29. The ore chute system of claim 25, wherein the lever arm assembly includes an axle and wherein the first arm and the second arm of the lever arm assembly are offset and are mounted to respective ends of the axle.

30. The ore chute system of claim 29, wherein the first arm has a first length, wherein the second arm has a second length, and wherein the first length is greater than the second length, whereby the lever arm assembly provides a mechanical advantage.

31. The ore chute system of claim 23, wherein the chute lip actuator is coupled between the chute lip and the chute box.

32. The ore chute system of claim 23, wherein the chute lip actuator is a hydraulic cylinder.

33. The ore chute system of claim 23, wherein the chute box is mounted on a chute support frame and wherein the counterweight assembly is mounted to the chute support frame.

34. The ore chute system of claim 23, wherein the chute lip actuator is at least one chute lip actuator and wherein the chute lip counterweight system is at least one chute lip counterweight system.

* * * * *